(12) United States Patent
Yang et al.

(10) Patent No.: US 11,383,480 B2
(45) Date of Patent: Jul. 12, 2022

(54) HYDROEMBEDDED FILM-BASED COMPOSITES

(71) Applicant: Kimberly-Clark Worldwide, Inc., Neenah, WI (US)

(72) Inventors: Kaiyuan Yang, Cumming, GA (US); Carl Gerard Rippl, Appleton, WI (US); Peiguang Zhou, Appleton, WI (US); Yiming Weng, Alpharetta, GA (US); Michael Andrew Zawadzki, Appleton, WI (US); Stephen Michael Lindsay, Appleton, WI (US); James Benjamin Harvey, Spring City, TN (US); Joel Brostin, Alpharetta, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 400 days.

(21) Appl. No.: 15/558,297

(22) PCT Filed: Feb. 24, 2016

(86) PCT No.: PCT/US2016/019330
§ 371 (c)(1),
(2) Date: Sep. 14, 2017

(87) PCT Pub. No.: WO2016/160185
PCT Pub. Date: Oct. 6, 2016

(65) Prior Publication Data
US 2018/0056624 A1    Mar. 1, 2018

Related U.S. Application Data

(60) Provisional application No. 62/140,865, filed on Mar. 31, 2015.

(51) Int. Cl.
*B32B 5/04* (2006.01)
*B32B 5/02* (2006.01)
(Continued)

(52) U.S. Cl.
CPC ............. *B32B 5/04* (2013.01); *A47L 13/16* (2013.01); *B32B 5/022* (2013.01); *B32B 5/08* (2013.01);
(Continued)

(58) Field of Classification Search
None
See application file for complete search history.

(56) References Cited

U.S. PATENT DOCUMENTS 4,775,579 A    10/1988   Hagy et al.
4,939,016 A    7/1990    Radwanski et al.
(Continued)

FOREIGN PATENT DOCUMENTS

EP    0 693 585 A2    1/1996
JP    03-010799 A     1/1991
JP    06-322650 A     11/1994

*Primary Examiner* — Arti Singh-Pandey
(74) *Attorney, Agent, or Firm* — Kimberly-Clark Worldwide, Inc.

(57) ABSTRACT

A substrate has an elastomeric film having surfaces and a nonwoven web having fibers, wherein a plurality of fibers is partially embedded in one surface of the film. In addition, a substrate has an elastomeric film and a nonwoven web having fibers, wherein a plurality of fibers is partially embedded in one surface of the film, and wherein the substrate is essentially free of adhesives and film-based microfibers. A method for making a film/nonwoven composite includes providing an elastomeric film traveling in a machine direction; providing a nonwoven web traveling in the machine direction in face-to-face contact with the film, wherein the nonwoven web includes fibers; and impinging (Continued)

the elastomeric film with hydro jets such that at least some of the fibers become embedded in the film.

8 Claims, 7 Drawing Sheets

(51) Int. Cl.
| | |
|---|---|
| *B32B 5/08* | (2006.01) |
| *B32B 27/08* | (2006.01) |
| *B32B 27/12* | (2006.01) |
| *B32B 27/32* | (2006.01) |
| *B32B 5/10* | (2006.01) |
| *B32B 27/30* | (2006.01) |
| *D04H 1/498* | (2012.01) |
| *B32B 37/00* | (2006.01) |
| *B32B 37/20* | (2006.01) |
| *A47L 13/16* | (2006.01) |

(52) U.S. Cl.
CPC ............... *B32B 5/10* (2013.01); *B32B 27/08* (2013.01); *B32B 27/12* (2013.01); *B32B 27/302* (2013.01); *B32B 27/32* (2013.01); *D04H 1/498* (2013.01); *B32B 37/20* (2013.01); *B32B 2037/0092* (2013.01); *B32B 2260/021* (2013.01); *B32B 2260/046* (2013.01); *B32B 2262/0253* (2013.01); *B32B 2262/062* (2013.01); *B32B 2262/14* (2013.01); *B32B 2274/00* (2013.01); *B32B 2305/20* (2013.01); *B32B 2307/51* (2013.01); *B32B 2307/518* (2013.01); *B32B 2307/724* (2013.01); *B32B 2307/732* (2013.01); *B32B 2432/00* (2013.01); *B32B 2437/00* (2013.01); *B32B 2535/00* (2013.01); *B32B 2553/00* (2013.01); *B32B 2555/00* (2013.01); *B32B 2571/00* (2013.01)

(56) References Cited

U.S. PATENT DOCUMENTS

| | | | |
|---|---|---|---|
| 4,970,104 A | 11/1990 | Radwanski | |
| 7,195,814 B2 | 3/2007 | Ista et al. | |
| 2004/0121683 A1* | 6/2004 | Jordan | B32B 5/26 442/182 |
| 2008/0241476 A1* | 10/2008 | Olguin | B32B 7/14 428/152 |
| 2014/0332476 A1 | 11/2014 | Pourdeyhimi | |
| 2016/0319470 A1* | 11/2016 | Jenkins | D04H 1/425 |
| 2016/0332148 A1* | 11/2016 | Desmedt | B01J 23/6527 |
| 2016/0332418 A1* | 11/2016 | Jenkins | B32B 27/32 |

\* cited by examiner

HYDROEMBEDDED FILM-BASED COMPOSITES

BACKGROUND

The present disclosure is generally directed to absorbent and elastic laminates. In particular, the present disclosure is directed to elastic and non-elastic laminates with hydroembedded components and their use in various product applications.

Traditional hydroentanglement processes (also known as hydraulic entanglement) are processes in which fluid jets are used to cause a mingling or entangling of fibers in a single sheet, or from a first fibrous sheet into an adjacent second fibrous sheet. Such processes allow for the incorporation of natural or synthetic fibers from a first sheet into a second web or fibrous sheet, so as to impart improved properties to the sheet that would otherwise not have been present in the second sheet. For example, the use of hydroentangling technology can impart improved feel or absorbency to a pre-formed web, which attributes would otherwise not have been originally present. Such hydroentangled fibers can be a wide variety of fibers such as for example, cellulosic or synthetic staple fibers or synthetic substantially continuous fibers as are known in the patent art. Hydroentanglement technology is described for example, in U.S. Pat. No. 4,144,370 to Boulton, U.S. Pat. No. 4,808,467 to Suskind et al., U.S. Pat. Nos. 4,931,355, 4,950,531 and 4,970,104 to Radwanski, each of which is hereby incorporated by reference thereto in its entirety.

The natural or synthetic fibers of a web that are entangled into a second web are often not elastic or extensible, but can be. Nevertheless, such fibers can be hydroentangled into a coform web or an elastic knit or net-like web or sheet, to create or alter a laminate structure that can be in a final form of a knit-like web material or elastic netting containing the hydroentangled fibers. The bulkiness of such materials has proven to be somewhat limited. Examples of various hydroentangled webs are illustrated in U.S. Pat. No. 4,775,579 to Hagy et al, U.S. Pat. Nos. 4,879,170 and 4,939,016 to Radwanski et al., U.S. Pat. Nos. 5,334,446 and 5,431,991 to Quantrille, U.S. Pat. No. 5,635,290 to Stopper et al., and U.S. Pat. No. 6,177,370 to Skoog et al., each of which is hereby incorporated by reference thereto in its entirety.

In previous elastic laminates, it has been difficult to accomplish sufficient uniform entanglement to create a relatively homogeneous elastic material. Such natural or synthetic staple fibers (which are typically absorbent but inelastic) that are often used for entanglement can become dislodged from the elastic composite due to limited entanglement, and a lack of coordination of extensibility attributes between the layers. The dislodging of fibers can produce an irregular or fuzzy substrate surface, which results in pilling of fibers off of the entangled webs. Such fuzzy topography is not always desirable. There is therefore a need for a relatively homogenous elastic and absorbent laminate construction.

Film-nonwoven laminates are typically bonded via adhesive because the film has no fibers with which the nonwoven can be hydroentangled. The use of adhesives, in some cases, can significantly impact and compromise the nonwoven side's properties that can be important to the desired application. For example, the nonwoven side can lose elasticity and softness because adhesives will fix and lock down fibers. One previous effort sought to limit the amount of adhesive used by essentially shredding the film to create microfibers that could then be hydro-entangled with a nonwoven. Under this method, production of microfibers sufficient to allow hydroentanglement with a nonwoven can, however, compromise the film structure and require multiple runs for films to be fiberized.

As a result, there is a need to enable bonding of a nonwoven to a film without using adhesive and without adversely affecting the performance or structure of the film while reserving nonwoven side's desired properties including softness, elasticity, and absorbent capacity.

SUMMARY

This disclosure describes a hydroembedded composite manufactured using traditional hydro-entangling processes to attach a nonwoven basesheet onto a polymeric film without involving adhesives, heat, needling, etc. The composites described herein represent a new class of very soft, flexible, and cloth-like nonwoven/film structures that can potentially be used for a variety of applications such as functional elastics, cleaning wipes, medical fabrics, protection garments, filtration, packaging, personal care articles, and others.

In one aspect, a substrate has an elastomeric film having surfaces and a nonwoven web having fibers, wherein a plurality of fibers is partially embedded in one surface of the film.

In an alternate aspect, a substrate has an elastomeric film and a nonwoven web having fibers, wherein a plurality of fibers is partially embedded in one surface of the film, and wherein the substrate is essentially free of adhesives and film-based microfibers.

In another aspect, a method for making a film/nonwoven composite includes providing an elastomeric film traveling in a machine direction; providing a nonwoven web traveling in the machine direction in face-to-face contact with the film, wherein the nonwoven web includes fibers; and impinging the elastomeric film with hydro jets such that at least some of the fibers become embedded in the film.

Objects and advantages of the disclosure are set forth below in the following description, or can be learned through practice of the disclosure.

BRIEF DESCRIPTION OF THE DRAWINGS

The present disclosure will be more fully understood, and further features will become apparent, when reference is made to the following detailed description and the accompanying drawings. The drawings are merely representative and are not intended to limit the scope of the claims.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

As used herein the term "nonwoven fabric or web" refers to a web having a structure of individual fibers or threads that are interlaid, but not in an identifiable manner as in a knitted fabric. Nonwoven fabrics or webs have been formed from many processes such as for example, meltblowing processes, spunbonding processes, bonded carded web processes, etc.

As used herein, the term "meltblown web" generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which can be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto. Generally speaking, meltblown fibers can be microfibers that are substantially continuous or discontinuous, generally smaller than 10 microns in diameter, and generally tacky when deposited onto a collecting surface.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., U.S. Pat. No. 4,340,563 to Appel, et al. and U.S. Pat. No. 5,382,400 to Pike, et al., which are incorporated herein in their entirety by reference hereto thereto. Spunbond fibers are generally not tacky when they are deposited onto a collecting surface. Spunbond fibers can sometimes have diameters less than about 40 microns, and are often between about 5 to about 20 microns.

As used herein the term "staple fiber" means fibers that have a fiber length generally in the range of about 0.5 to about 150 millimeters. Staple fibers can be cellulosic fibers or non-cellulosic fibers. Some examples of suitable non-cellulosic fibers that can be used include, but are not limited to, hydrophilically-treated polyolefin fibers, polyester fibers, nylon fibers, polyvinyl acetate fibers, and mixtures thereof. Hydrophilic treatments can include durable surface treatments and treatments in polymer resins/blends. Cellulosic staple fibers include for example, pulp, thermomechanical pulp, synthetic cellulosic fibers, modified cellulosic fibers, and the like. Cellulosic fibers can be obtained from secondary or recycled sources. Some examples of suitable cellulosic fiber sources include virgin wood fibers, such as thermomechanical, bleached and unbleached softwood and hardwood pulps. Secondary or recycled cellulosic fibers can be obtained from office waste, newsprint, brown paper stock, and paperboard scrap. Further, vegetable fibers, such as abaca, flax, milkweed, cotton, modified cotton, cotton linters, can also be used as the cellulosic fibers. In addition, synthetic cellulosic fibers such as, for example, rayon, viscose rayon and lyocell can be used. Modified cellulosic fibers are generally composed of derivatives of cellulose formed by substitution of appropriate radicals (e.g., carboxyl, alkyl, acetate, nitrate, etc.) for hydroxyl groups along the carbon chain. Desirable staple fibers for the purposes of this application are hydrophilic, such as traditional cellulosic fibers (a desirable example of which is pulp fibers, as can be found in rolled tissues and paper-based towels).

As used herein, the term "substantially continuous fibers" is intended to mean fibers that have a length that is greater than the length of staple fibers. The term is intended to include fibers that are continuous, such as spunbond fibers, and fibers that are not continuous, but have a defined length greater than about 150 millimeters.

As used herein "bonded carded webs" or "BCW" refers to nonwoven webs formed by carding processes as are known to those skilled in the art and further described, for example, in U.S. Pat. No. 4,488,928 to Ali Khan et al., which is incorporated herein by reference thereto. Briefly, carding processes involve starting with a blend of, for example, staple fibers with bonding fibers or other bonding components in a bulky ball that is combed or otherwise treated to provide a generally uniform basis weight. This web is heated or otherwise treated to activate the adhesive component resulting in an integrated, usually lofty nonwoven material.

The basis weight of nonwoven webs is usually expressed in ounces of material per square yard (osy) or grams per square meter (gsm) and fiber diameters are usually expressed in microns, or in the case of staple fibers, denier. It is noted that to convert from osy to gsm, multiply osy by 33.91.

As used herein the terms "machine direction" or "MD" generally refers to the direction in which a material is produced. It is also often the direction of travel of the forming surface onto which fibers are deposited during formation of a non-woven web. The term "cross-machine direction" or "CD" refers to the direction perpendicular to the machine direction. Dimensions measured in the cross-machine direction (CD) are referred to as "width" dimensions, while dimensions measured in the machine direction (MD) are referred to as "length" dimensions. The width and length dimensions of a planar sheet make up the X and Y directions of the sheet. The dimension in the depth direction of a planar sheet is also referred to as the Z-direction.

As used herein, the terms "elastomeric" and "elastic" are used interchangeably and shall mean a layer, material, laminate or composite that is generally capable of recovering its shape after deformation when the deforming force is removed. Specifically, when used herein, "elastic" or "elastomeric" is meant to be that property of any material that, upon application of a biasing force, permits the material to be stretchable to a stretched biased length that is at least about fifty (50) percent greater than its relaxed unbiased length, and that will cause the material to recover at least forty (40) percent of its elongation upon release of the stretching force. A hypothetical example that would satisfy this definition of an elastomeric material would be a one (1) inch sample of a material that is elongatable to at least 1.50 inches and that, upon being elongated to 1.50 inches and released, will recover to a length of less than 1.30 inches. Many elastic materials can be stretched by much more than fifty (50) percent of their relaxed length, and many of these will recover to substantially their original relaxed length upon release of the stretching force.

As used herein, the terms "fluid entangling" and "fluid-entangled" generally refer to a formation process for creating a degree of fiber entanglement within a given fibrous nonwoven web or between fibrous nonwoven webs and other materials so as to make the separation of the individual fibers and/or the layers more difficult as a result of the entanglement. Generally, this is accomplished by supporting the web or other material on some type of forming or carrier surface, such as a forming wire, which has at least some degree of permeability to the impinging pressurized fluid. A pressurized fluid stream (usually multiple streams at a manifold or series of manifolds) is then directed against the surface of the web and/or other materials that is opposite the supported surface of the web and/or other materials. The supported surface of a web and/or other material is also known as the wire side, and the unsupported surface of a web and/or other material is also known as the pulp side. The pressurized fluid contacts the fibers of the web and forces portions of the fibers in the direction of the fluid flow, thus displacing all or a portion of a plurality of the fibers towards the supported surface (wire side) of the web. The result is a further entanglement of the fibers in what can be termed the Z-direction of the web (its depth direction or thickness). When two or more separate webs or other layers are placed adjacent one another on the forming/carrier surface and subjected to the pressurized fluid, the generally desired result is that some of the fibers of at least one of the webs are forced into the adjacent web or layer, thereby causing fiber entanglement between the interfaces of the two surfaces so as to result in the bonding or joining of the webs/layers together due to the increased entanglement of the fibers. The degree of bonding or entanglement will depend on a number of factors including, but not limited to, the types of fibers being used, their fiber lengths, the degree of pre-bonding or entanglement of the web or webs prior to subjection to the fluid entangling process, the type of fluid being used (liquids, such as water, steam or gases, such as air), the pressure of the fluid, the number of fluid streams, the speed of the process, the dwell time of the fluid and the porosity of the web or webs/other layers and the forming/carrier surface (such as a forming wire). One of the most common fluid entangling processes is referred to as hydroentangling, which is a well-known process to those of ordinary skill in the art of nonwoven webs. Examples of fluid entangling processes can be found in U.S. Pat. No. 3,485,706 to Evans, and U.S. Pat. Nos. 4,939,016, 4,959,531 and 4,970,104 to Radwanski, each of which is incorporated herein in its entirety by reference thereto for all purposes. A typical hydroentangling process utilizes high pressure jet streams of water to entangle staple fibers and/or substantially continuous fibers to form a highly entangled consolidated fibrous structure. Hydroentangled nonwoven fabrics of staple length fibers and substantially continuous fibers are disclosed for example in U.S. Pat. No. 3,494,821 to Evans and U.S. Pat. No. 4,144,370 to Boulton, each of which is hereby incorporated by reference thereto in their entirety. Further examples of hydroentangled composite nonwoven fabrics of a continuous filament nonwoven web and a pulp layer are disclosed, for example in U.S. Pat. No. 5,284,703 to Everhart et al., and U.S. Pat. No. 6,315,864 to Anderson, et al. each of which is hereby incorporated by reference thereto in their entirety. The hydroentangling manufacturing conditions described in such references are representative of operating conditions that are acceptable for use in manufacturing hydroentangled sheets in accordance with the disclosure, unless otherwise noted.

As used herein, the term "g/cc" generally refers to grams per cubic centimeter.

As used herein, the term "hydrophilic" generally refers to fibers or films, or the surfaces of fibers or films that are wettable by aqueous liquids in contact with the fibers. The term "hydrophobic" includes those materials that are not hydrophilic as defined. The phrase "naturally hydrophobic" refers to those materials that are hydrophobic in their chemical composition state without additives or treatments affecting the hydrophobicity.

The degree of wetting of the materials can, in turn, be described in terms of the contact angles and the surface tensions of the liquids and materials involved. Equipment and techniques suitable for measuring the wettability of particular fiber materials or blends of fiber materials can be provided by the Cahn SFA-222 Surface Force Analyzer System, or a substantially equivalent system. When measured with this system, fibers having contact angles less than 90 are designated "wettable" or hydrophilic, and fibers having contact angles greater than 90 are designated "non-wettable" or hydrophobic.

As used herein, the term "personal care product" refers to diapers, training pants, absorbent underpants, adult incontinence products, sanitary wipes and feminine hygiene products, such as sanitary napkins, pads, and liners, and the like. The term "absorbent medical product" is employed to refer to products such as medical bandages, tampons intended for medical, dental, surgical, and/or nasal use, surgical drapes and garments, coverings in medical settings, and the like.

The term "composite" as used herein, refers to a film material that has been hydroembedded with a nonwoven web including fibers. The film material itself can be monolayer, multi-component, or multilayer. The composite can be apertured and breathable, or the film material of the composite can be essentially intact.

As used herein, the term "embedded" means an object fixed firmly in a surrounding mass. For example, a fiber or a part of a fiber can be embedded in a film by being forced into or onto the film material where it remains fixed without adhesive or other bonding agent. "Hydroembedded" means the object is so forced using a fluid such as water.

Reference now will be made in detail to various aspects of the disclosure, one or more examples of which are set forth below. Each example is provided by way of explanation, not of limitation of the disclosure. In fact, it will be apparent to those skilled in the art that various modifications and variations can be made in the present disclosure without departing from the scope or spirit of the disclosure. For instance, features illustrated or described as part of one aspect, can be used on another aspect to yield a still further aspect. Thus it is intended that the present disclosure cover such modifications and variations.

Figure 1:
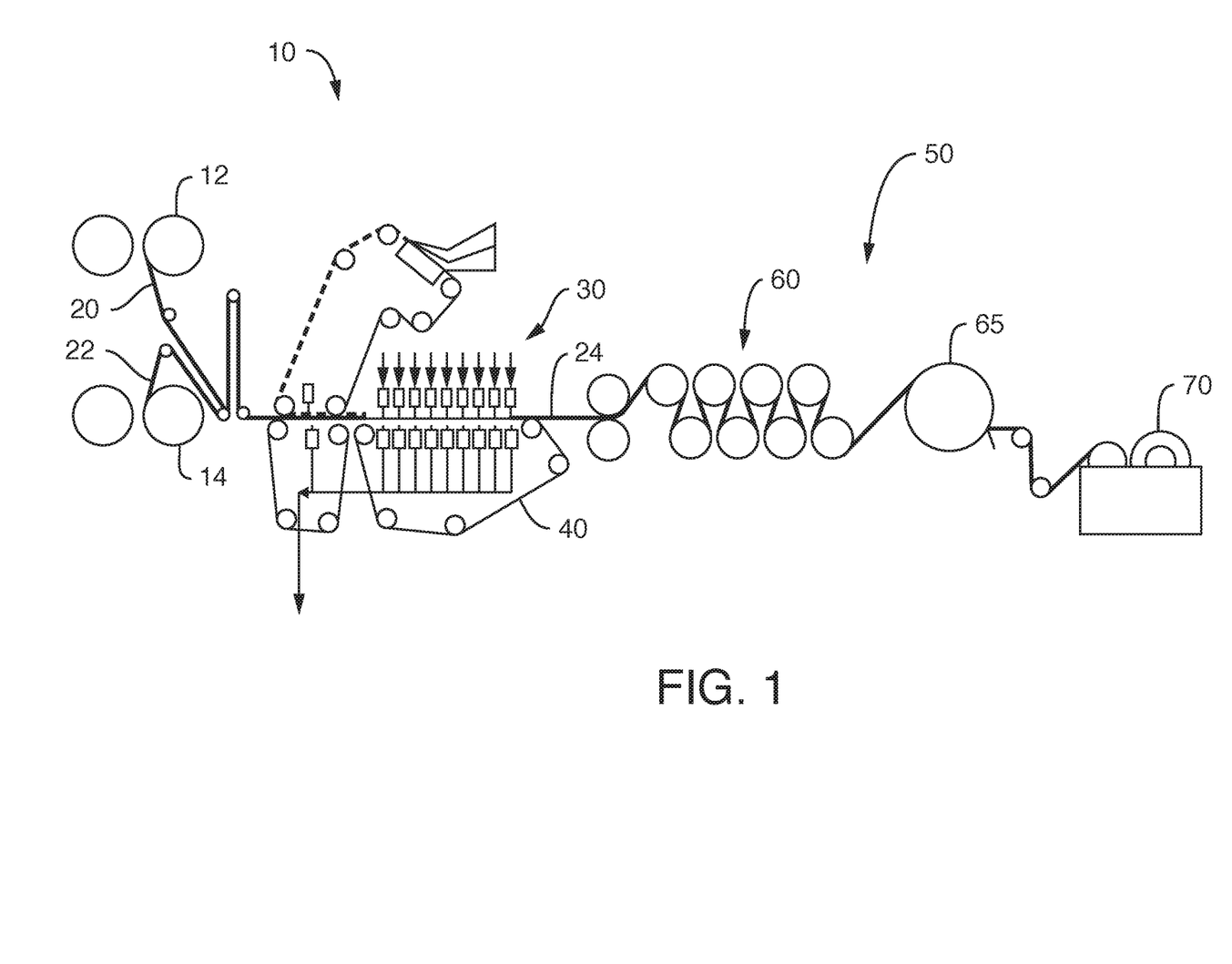
FIG. 1 illustrates a schematic view of a manufacturing process generally along the machine direction, in accordance with the disclosure
Figure 13:
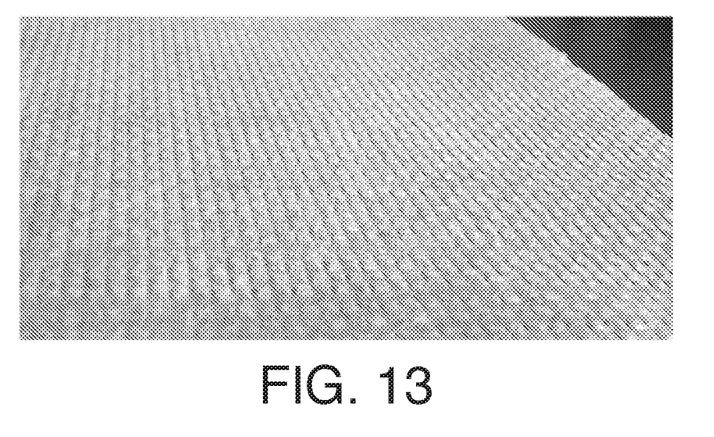
FIG. 13 is a hydroembedded film/nonwoven spunbond composite with a textured surface resulting from the use of a forming screen.

The hydroembedding as described herein is performed using a traditional hydro-entangling installation. As illustrated in FIG. 1, polymeric film and nonwoven web rolls are introduced by positioning the film and the nonwoven web in a face-to-face relation, in this case with the film on top and the nonwoven web on the bottom. Hydroembedding occurs when high velocity water from hydro jets push the film into the nonwoven web to form the bonds. An in-situ-formed pulp or synthetic fiber basesheet can also be employed as a replacement for the nonwoven web. Depending upon the fluid pressure of the hydro jets, polymeric films in various aspects can be left unperforated or can be perforated to form breathable composites. In other aspects, a textured surface can be formed on the composite using a forming screen with a desired pattern, as illustrated in FIG. 13. In still other aspects, the hydroembedding can be repeated until satisfactory embossing and/or bonding is achieved.

The elastomeric film can be hydroembedded with a hydrophilic layer uniformly so as to create an elastic and absorbent material. This composite 24 demonstrates significant integrity without the necessity for adhesive or other further bonding mechanisms to bond the layers together.

As can be seen in FIG. 1, a process 10 of producing the hydroembedded film/nonwoven composite of the present disclosure is illustrated. In one aspect, a previously manufactured (pre-made) elastomeric film 20 is unrolled an unwind roll 12 and fed into the disclosed process 10. In another aspect, the elastomeric film can be produced in-line prior to passing it through the disclosed process 10, rather than being unwound from a storage or unwind roll 12 as shown.

In the illustrated aspect of FIG. 1, the elastomeric film 20 is fed to a position where it is met with a nonwoven fibrous web 22, which is unwound from a supply roll 14. While a pre-made nonwoven fibrous web 22 is shown in FIG. 1, it should be appreciated that the nonwoven fibrous web 22 can either be pre-made or in-line produced. For example, the nonwoven fibrous web 22 can be produced off-line or in-line using a wetlaid, dry-laid, or carded process as is known in the art. Such nonwoven fibrous web 22 can be of a single layer or of multiple layers, and can include cellulosic fibers, compliant fibers, staple fibers, substantially continuous fibers, pulp fibers, or other fibers of the types described herein. It is desirable in one aspect for the nonwoven fibrous web 22 to have a basis weight of between about 2 gsm and about 200 gsm, alternatively, between about 2 and about 100 gsm, alternatively, between about 5 and about 50 gsm, and alternatively between about 10 gsm and about 30 gsm.

At the point of meeting with the nonwoven fibrous web 22, the elastomeric film 20 is running at the same machine-direction speed as the nonwoven fibrous web 22, both of which are fed into a hydroentangling manifold 30 via a moving foraminous web carrier surface 40. The nonwoven fibrous web 22 can encompass any number of web materials, such as for example staple fibers, substantially continuous fibers, and combinations of staple fiber and/or substantially continuous fibers.

Essentially, the elastomeric film 20 is laid on the nonwoven fibrous web 22 (such as a pulp fiber layer), which rests upon the foraminous web carrier surface 40 of a conventional hydraulic entangling machine. It is desirable that the elastomeric film 20 be between the nonwoven fibrous web 22 and the hydraulic entangling manifold(s) 30. The nonwoven fibrous web 22 and elastomeric film 20 pass under one or more hydraulic entangling manifolds 30 (although one is representationally shown) and are treated with jets of fluid 21 to embed the pulp or other fibers of the nonwoven fibrous web 22 within the adjacent elastomeric film 20. The hydroembedding can occur while the nonwoven fibrous web 22 is highly saturated with water (wet-laid), or alternatively, while the nonwoven fibrous web 22 is a dry air-laid or dry-laid layer of fibers.

The hydroembedding can be accomplished using conventional hydroentangling equipment such as can be found, for example, in U.S. Pat. No. 3,485,706 to Evans. The hydroembedding of the present disclosure can be carried out with any appropriate working fluid such as, for example, water. The working fluid flows through at least one manifold that evenly distributes the fluid to a series of individual holes or orifices. These holes or orifices can be from about 0.003 to about 0.015 inch in diameter. A single manifold can be used or several manifolds can be arranged in succession. In the hydroembedding process, the working fluid passes through the orifices at pressures ranging from about 200 to about 5000 pounds per square inch (psi), alternatively between about 200 to about 2900 psi, alternatively between about 1400 to about 2900 psi, further alternatively between about 200 and 2000 psi.

For the hydroembedding of fibers into an elastomeric film 20, it is important to use pressures that do not rupture or penetrate the film 20, unless the formation of apertures to yield a breathable composite is desired. Higher pressures would be used for embedding in more dense materials, but pressures should be monitored so as to avoid undue rupturing. At the upper ranges of the described pressures, it is contemplated that the composite fabrics can be processed at speeds of as low as about 10 feet per minute (fpm) to as high as about 1000 fpm. The fluid is ejected from injectors/jet strips that are positioned typically from between about 0.25 and 2 inches, or alternatively between about 0.5 inches to about 1 inch above the elastomeric film 20. The fluid impacts the elastomeric film 20, which is supported by the nonwoven fibrous web 22 and the foraminous web carrier surface 40. The foraminous web carrier surface 40 can, for example, be a forming screen such as a single plane wire mesh having a mesh size of from about 40×40 to about 100×100. The foraminous web carrier surface 40 can also be a multi-ply mesh having a mesh size from about 50×50 to about 200×200. As is typical in many hydro jet treatment processes, vacuum slots can be located directly beneath the hydroentangling manifolds or beneath the foraminous web carrier surface 40 or somewhat downstream (to the right in the machine direction of FIG. 1) such that excess fluid is withdrawn from the hydroembedded composite 24. After the fluid jet treatment, the composite 24 can be transported to a drying operation 50, which can include, for example, a can dryer system 60 and a Yankee dryer 65, in which the hydroembedded composite 24 is dried at temperatures up to the maximum non-destructive temperatures allowed by the materials chosen. Such drying operation 50 can be positioned prior to winding the hydroembedded composite 24 for final storage on a roll 70, or prior to the composite 24 being passed along for further processing.

While not shown, it can be desirable to use finishing steps and/or post treatment processes to impart selected properties to the hydroembedded composite 24. For example, chemical post treatments can be added to the composite at a later step, or the composite can be transported to cutters, slitters, or other processing equipment for converting the composite into a final product, such as wipes, components of personal care absorbent articles, or medical garment or covering fabrics. Further, patterning can be placed through known processes into the outer surfaces of the composite. Examples of wipe-type products can be found in U.S. Pat. No. 7,194,788 to Clark et al., and U.S. Publication No. 2011/0119850 to Mallory et al. each of which is incorporated herein by reference thereto.

The elastomeric film 20 can be any suitable film including mono-layered films, multilayered films, and biaxial films.

The elastomeric film 20 has a hydro jet-facing side 40 and a side 42 facing the nonwoven fibrous web 22. The nonwoven fibrous web 22 has a film-facing side and a wire-facing side (that is, a side facing the foraminous web carrier surface 40 (most commonly a forming wire or screen)). As the combined webs pass through the hydroentanglement manifold 30, fluid pushes the elastomeric film 20 into the fibers of the nonwoven fibrous web 22 such that the fibers of the nonwoven fibrous web 22 are embedded in the elastomeric film 20 at the side 42 facing the nonwoven fibrous web 22 such that the layers are bonded together via the embedded fibers to create the composite 24. The elastomeric film 20 is forced onto the nonwoven fibrous web 22 such that the fibers of the nonwoven fibrous web 22 are forced into the elastomeric film 20. Such embedded fibers act to create a web with high levels of integrity, thereby eliminating the need for bonding adhesive between the various layers of the composite 24.

Polymeric films used for the present disclosure are preferably a single layer elastic film (an elastic polymer such as styrenic block copolymer (SBC) thermal elastomers, VISTAMAXX propylene-based elastomers, INFUSE olefin block copolymers, and ENGAGE polyolefin elastomers) or AB-type, ABA-type, or ABC-type multilayer elastic films in which the elastic layer is sandwiched between two non-elastic or substantially less elastic films A and B. It is understood that the fluid pressure from hydro jets will push and stretch (but will not penetrate through) impacted areas into the nonwoven fiber web, causing the embedding of fibers into the film. The subsequent retraction of stretched areas will then lock down the embedded fibers to form the bonded areas. In an additional aspect in which an elastic layer is at the center of the film, the push and stretch will cause the top non-elastic layer to crack, which will lead to the formation of openings on the film's surface to accommodate the fibers. The film surface with a cracked non-elastic layer will also allow the direct interaction of the elastic layer with nonwoven fibers. The direct interaction between the elastic layer and the fibers is potentially important as it is well known that elastic polymers often have higher tackiness than non-elastic polymers. The higher tackiness can allow improved embedding of nonwoven fibers into the film.

Preferably, the elastic films used in the present invention can stretch at least 30~50% in comparison to its non-stretched length. In some cases, it is desirable that films can be stretched up to 50%-100%, 100%-200%, or 200%-400%.

EXAMPLES

Materials and Procedures

Spunbond basesheets used for the present disclosure are standard 9-20 GSM polypropylene-based HYDROKNIT*- x-60, x-70, and x-80 nonwovens available from Kimberly-Clark Corp. Pigmented purple or blue spunbonds are also suitable. The coform basesheets used for the present disclosure are coform rolls with 15-25 GSM basis weights and a ratio of pulp fibers and meltblown polypropylene fibers of 70%:30%, also available from Kimberly-Clark Corp.

Polymeric films used for the present disclosure are single layer elastic film (an elastic polymer such as SBC thermal elastomers, VISTAMAXX propylene-based elastomers, INFUSE olefin block copolymers, and ENGAGE polyolefin elastomers) or AB-type, ABA-type, or ABC-type multilayer elastic films. AB-type films are generally formed by co-extruding layer A (10-30% A-plastic layer e.g., PP, polyethylene (PE), or polyolefin) and layer B (70-90% elastic polymer such as SBC thermal elastomers, VISTAMAXX propylene-based elastomers, INFUSE olefin block copolymers, and ENGAGE polyolefin elastomers) with thicknesses of 1-6 mil (0.02~50.150 mm) and basis weights ranging from 20-120 gsm. ABA- or ABC-type films are co-extruded films with layer A (10-30% plastic layer e.g., PP, PE, or polyolefin), layer B (70-90% elastic polymer such as SBC thermal elastomers, VISTAMAXX propylene-based elastomers, INFUSE olefin block copolymers, and ENGAGE polyolefin elastomers), and layer C (10-30% plastic layer e.g., PP, PE, or polyolefin) with thickness 1-6 mil (0.02~50.150 MM) and basis weight range 20-120 gsm).

The hydroembedding was performed using traditional hydro-entangling stations from which hydro jets were directed to hydroembed polymeric films into nonwoven basesheets, as depicted in FIG. 1. Hydro-entangling hydro jet pressure can be adjusted, depending upon the polymeric film's thickness, strength, and elasticity. In some aspects, the hydroembedding procedure might need to be repeated until a satisfactory embossing or bonding strength can be reached. Textured surfaces were formed by changing the forming wires/screens with a variety of desired patterns (FIG. 13, for example).

Structural analysis of hydroembedded composites was performed by analyzing surface, cross section, and film/nonwoven interface structural features by scanning electron microscopy (SEM) imaging. To clearly show the hydroembedded areas, samples were delaminated by slowly peeling away the nonwoven layer in a less densely bonded region of the material. Both sides of the film were mounted and coated for imaging in the SU6600 field emission SEM.

Example 1

Figure 2:
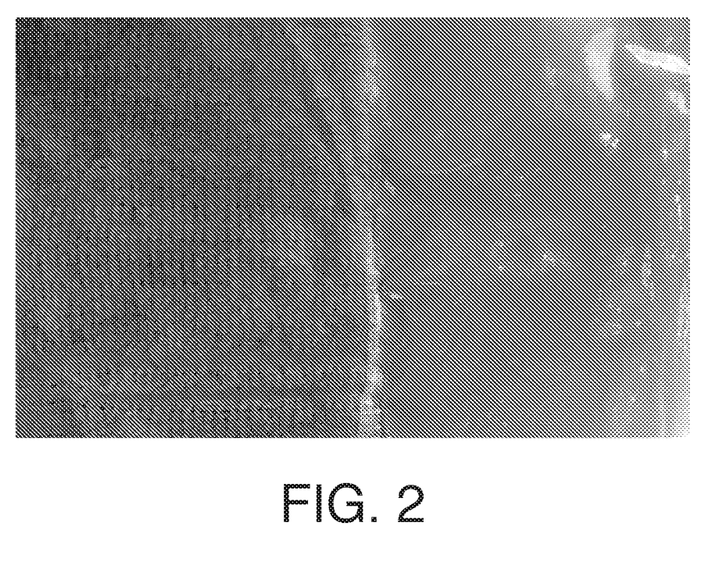
FIG. 2 is a photograph of a hydroembedded film/nonwoven spunbond composite, with the composite on the left, and with film alone on the right, using the process of FIG. 1.

Example 1 shows a hydroembedded laminate manufactured from a purple 12 GSM spunbond and a 120 GSM elastic VISTAMAXX propylene-based elastomer/KRATON elastomer (70:30) film (FIG. 2). In this example, a complete mesh between film and fibers was achieved and at the same time, significant film piercing by hydro jets can be seen. The resulting article is fully breathable.

Figure 3:
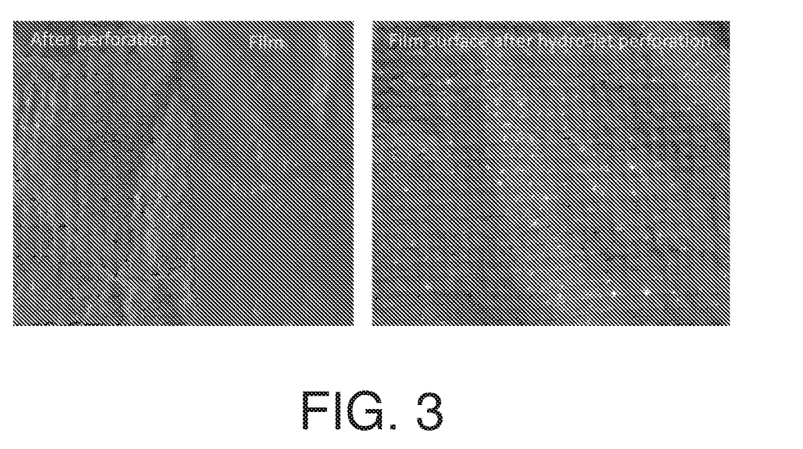
FIG. 3 is a photograph of perforations or piercings of the film layer by hydro jets to form a breathable structure using the process of FIG. 1.

The perforation or piercing of the film has also been independently confirmed by applying hydro jets only onto the films. FIG. 3 shows the perforated film and its surface features.

Example 2

Example 2 is an illustration of a hydroembedded laminate manufactured from a multiple layer film and 15 GSM coform (70% pulp and 30% polypropylene meltblown fibers). The film used in this example is a co-extruded multilayer 50 GSM ABA film with 20% polypropylene (PP) as skin layer A on both sides and 85% of VISTAMAXX 6102 FL propylene-based elastomer/15% KRATON MD 6716 elastomer (85:15) as middle layer B, or other films as described in materials and procedures section. In this example, the hydro jet pressure was adjusted to only form hydroembedding but not rupture or penetration of the film.

Figure 4:
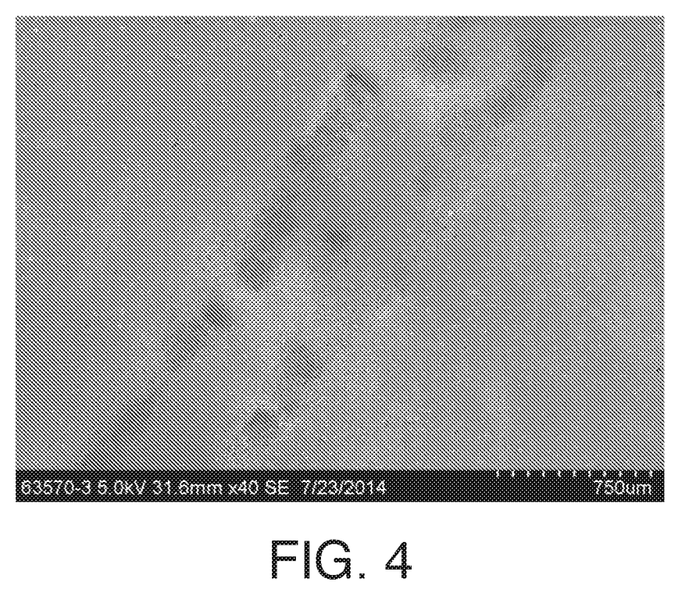
FIG. 4 is a photomicrograph illustrating hydro jet tracks on a film surface (at 40× magnification)
Figure 5:
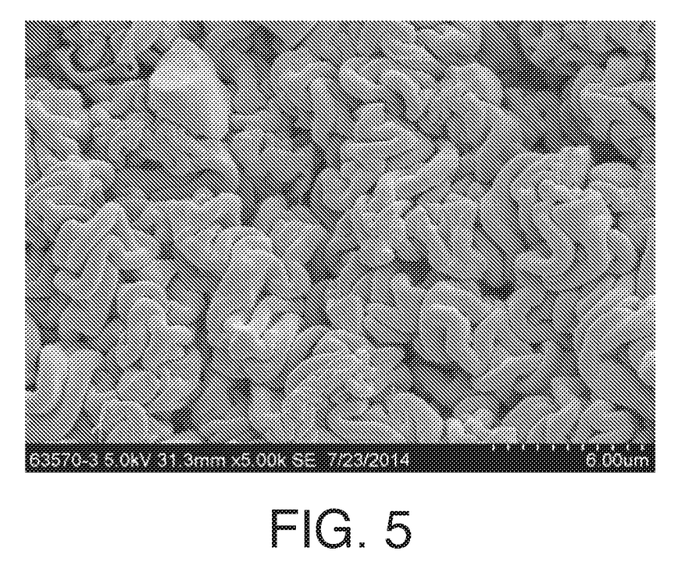
FIG. 5 is a photomicrograph illustrating a close-up of a hydro jet track on the film surface of FIG. 4 (at 5,000× magnification)
Figure 6:
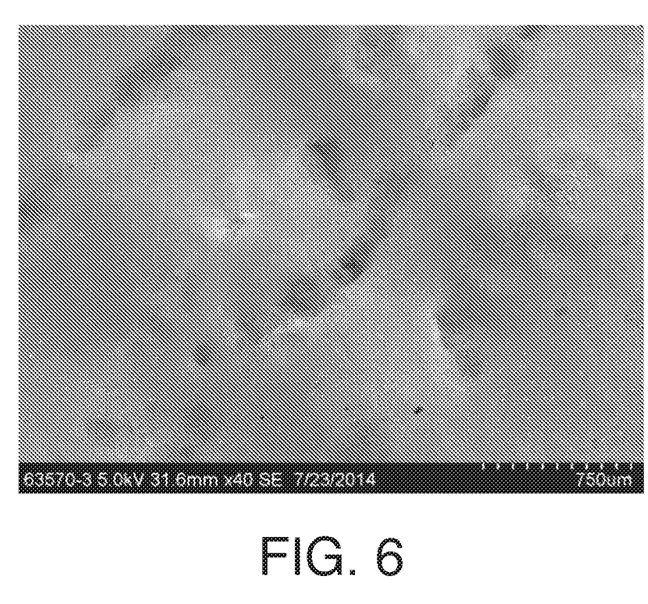
FIG. 6 is a photomicrograph illustrating hydro jet tracks on a film surface (at 40× magnification), where the hydro jet tracks are different from those of FIG. 4.
Figure 7:
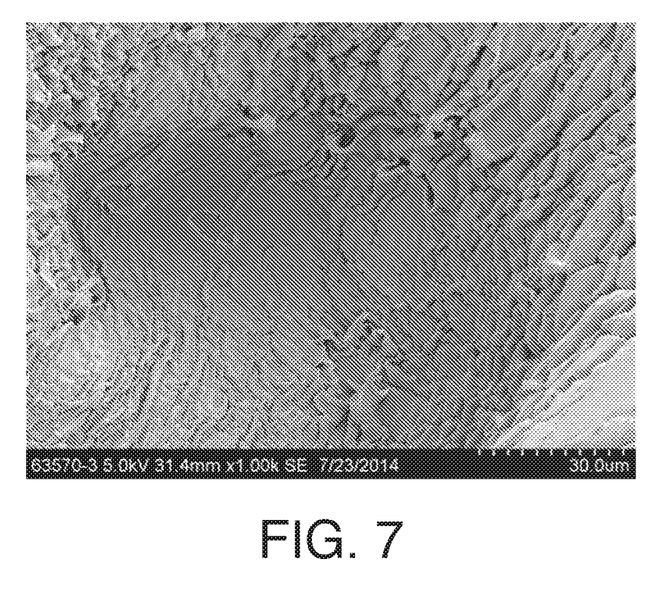
FIG. 7 is a photomicrograph illustrating hydro jet tracks on the film surface of FIG. 6 (at 1,000× magnification)

FIG. 4 shows the surface of the film impinged by the hydro jets. The jets stretch out the film during impact, and after the elastic recovery, the olefin skin wrinkles up into the texture seen in FIG. 5. FIG. 6 shows a similar image of hydro jet tracks. In the very center of this image there is a particularly deep impingement. FIG. 7 is a highly-magnified image of this particular crevice. Although the deformation is severe and unrecoverable, the hydro jet does not pierce the film.

Figure 8:
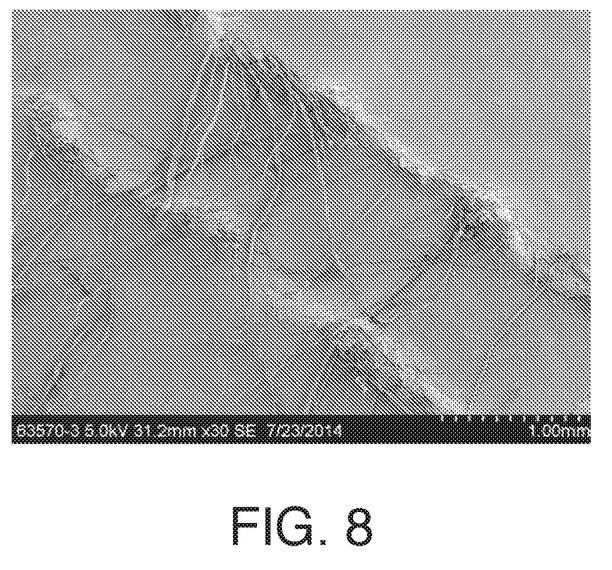
FIG. 8 is a photomicrograph illustrating the inside surface of the film layer after the nonwoven web (coform in this case) is peeled off (at 30× magnification)
Figure 9:
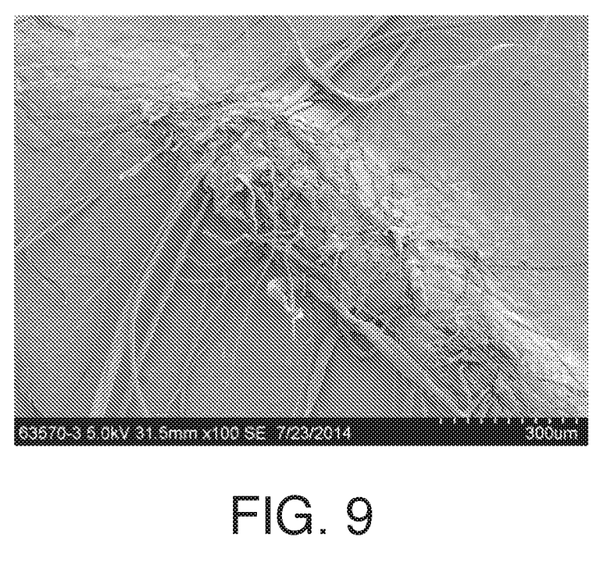
FIG. 9 is a photomicrograph illustrating the inside surface of the film layer after the nonwoven web (coform in this case) is peeled off (at 100× magnification)
Figure 10:
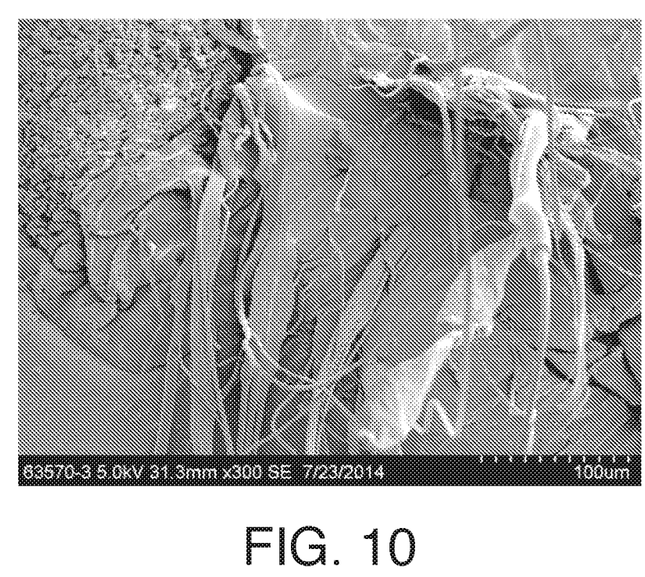
FIG. 10 is a photomicrograph illustrating the inside surface of the film layer after the nonwoven web (coform in this case) is peeled off (at 300× magnification)
Figure 11:
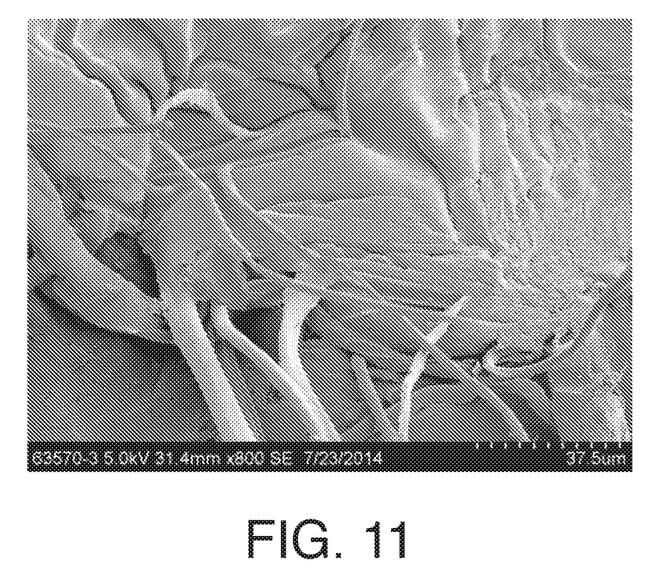
FIG. 11 is a photomicrograph illustrating the inside surface of the film layer after the nonwoven web (coform in this case) is peeled off (at 800× magnification)

FIG. 8 shows the inside surface of the film where the coform had been hydroembedded to the film. The coform was peeled off such that fibers hydroembedded in the film remained behind and could be observed. FIGS. 9-11 show more detailed images of the fusion between the coform and the film. As would be expected, it is predominantly the fibers of the PP meltblown that are embedded in the film, but some cellulose fibers are also embedded in the film as well.

Example 3

Figure 12:
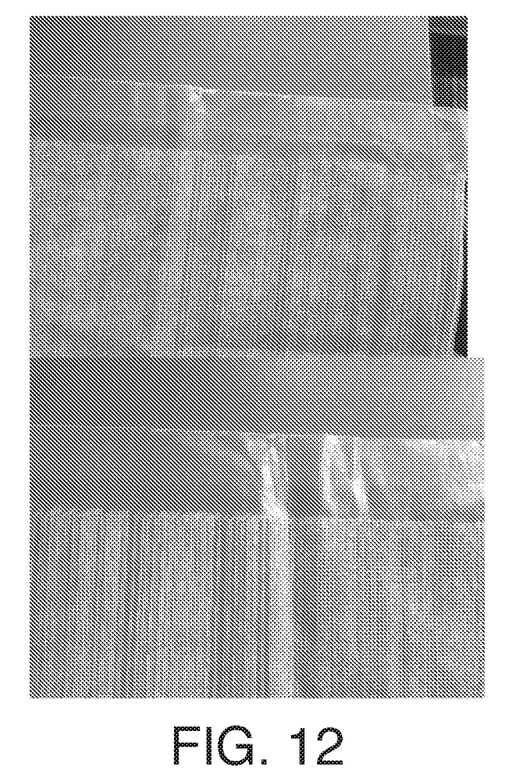
FIG. 12 is a hydroembedded film/nonwoven spunbond composite.

Example 3 is an illustration of a hydroembedded laminate manufactured from a multiple layer polymeric film and 12 GSM purple spunbond. FIG. 12 shows the surface structures of the spunbond side (left) and the polymeric film side (right). The structural features of this example are similar to those of Example 2 and no polymeric film perforation or piercing is observed.

Example 4

Example 4 is an illustration of a hydroembedded laminate with a textured surface. The laminate was formed by hydroembedding a 50 GSM multiple layer ABA film with 20% polypropylene (PP) as skin layer A on both sides and 85% of VISTAMAXX 6102 FL propylene-based elastomer/15% KRATON MD 6716 elastomer (85:15), or other films as described in materials and procedure's section and 15 GSM coform (70% pulp:30% PP). The forming wire or screen used for this example is the wire as described in association with FIG. 1. FIG. 13 shows the surface structures of the coform side. The structural features of this example are similar to those of Examples 2 and 3 and no polymeric film perforation or piercing is observed.

The sheet materials produced in accordance with this disclosure can be used in a variety of end product applications. For example, such sheet materials can be used for a variety of wipe-type products in which drapability, elasticity, and absorbency for both oil and water cleaning activities are desired. It is envisioned that the elastic and absorbent wipers can have beneficial use in penetrating tight areas to be cleaned. It is also contemplated that such sheet materials have end product applications in the technical areas of filtration, medical garments, covers, and bandages, and the personal care area, such as in the ears or side panels of baby/child care diapers, and adult feminine care applications. Articles made under this disclosure are very flexible and soft with a cloth-like feel, even the film side, and are fiber linting-free during stretch.

The elimination of adhesives allows direct embedding of fibers into film, resulting in a more flexible and less stiff basesheet with permanent 3D textured surfaces. The added flexibility and softness can be beneficial for cleaning fine surfaces such as furniture, touch screens, floors, bathrooms, and kitchens.

In a first particular aspect, a substrate has an elastomeric film and a nonwoven web having fibers, wherein a plurality of fibers is partially embedded in one surface of the film.

A second particular aspect includes the first particular aspect, wherein the elastomeric film is a mono-layered film.

A third particular aspect includes the first and/or second aspect, wherein the elastomeric film is a multilayered film.

A fourth particular aspect includes one or more of aspects 1-3, wherein the elastomeric film is a biaxial film.

A fifth particular aspect includes one or more of aspects 1-4, wherein the fibers include compliant fibers.

A sixth particular aspect includes one or more of aspects 1-5, wherein the fibers include staple fibers, substantially continuous fibers, pulp fibers, or a combination thereof.

A seventh particular aspect includes one or more of aspects 1-6, wherein the fibers include cellulosic fibers.

An eighth particular aspect includes one or more of aspects 1-7, wherein the substrate includes a three-dimensional pattern matching a forming screen.

A ninth particular aspect includes one or more of aspects 1-8, wherein the substrate is essentially free of film-based microfibers.

A tenth particular aspect includes one or more of aspects 1-9, wherein the substrate is without apertures.

An eleventh particular aspect includes one or more of aspects 1-10, wherein the substrate is breathable.

In a twelfth particular aspect, a substrate has an elastomeric film and a nonwoven web having fibers, wherein a plurality of fibers is partially embedded in one surface of the film, and wherein the substrate is essentially free of adhesives and film-based microfibers.

A thirteenth particular aspect includes the twelfth particular aspect, wherein the elastomeric film is a mono-layered film.

A fourteenth particular aspect includes the twelfth and/or thirteenth aspect, wherein the elastomeric film is a multi-layered film.

A fifteenth particular aspect includes one or more of aspects 12-14, wherein the fibers include cellulosic fibers.

A sixteenth particular aspect includes one or more of aspects 12-15, wherein the fibers include staple fibers, substantially continuous fibers, pulp fibers, or a combination thereof.

In a seventeenth particular aspect, a method for making a film/nonwoven composite includes providing an elastomeric film traveling in a machine direction; providing a nonwoven web traveling in the machine direction in face-to-face contact with the film, wherein the nonwoven web includes fibers; and impinging the elastomeric film with hydro jets such that at least some of the fibers become embedded in the film.

An eighteenth particular aspect includes the seventeenth aspect, wherein the nonwoven web includes staple fibers, substantially continuous fibers, pulp fibers, or a combination thereof.

A nineteenth particular aspect includes the seventeenth and/or eighteenth aspects, further comprising positioning the nonwoven web on a forming screen.

A twentieth particular aspect includes one or more of aspects 17-19, wherein the film/nonwoven composite is substantially free of film-based microfibers.

While the disclosure has been described in detail with respect to the specific aspects thereof, it will be appreciated that those skilled in the art, upon attaining an understanding of the foregoing, can readily conceive of alterations to, variations of, and equivalents to these aspects. Accordingly, the scope of the present disclosure should be assessed as that of the appended claims and any equivalents thereto.

What is claimed is:

1. A method for making a film/nonwoven composite, the method comprising:
providing an elastomeric film traveling in a machine direction;
providing a nonwoven web traveling in the machine direction in face-to-face contact with the film, wherein the nonwoven web includes fibers;
providing a hydraulic entangling manifold, the elastomeric film and the nonwoven web traveling in the machine direction to the hydraulic entangling manifold such that the elastomeric film is disposed between the hydraulic entangling manifold and the nonwoven web; and
impinging the elastomeric film with hydro jets from the hydraulic entangling manifold pushing the elastomeric film into the nonwoven web such that at least some of the fibers become embedded in the film.

2. The method of claim 1, wherein the nonwoven web includes staple fibers, substantially continuous fibers, pulp fibers, or a combination thereof.

3. The method of claim 1, further comprising positioning the nonwoven web on a forming screen.

4. The method of claim 1, wherein the film/nonwoven composite is substantially free of film-based microfibers.

5. The method of claim 1, wherein the hydro jets continuously bond the nonwoven web to the elastomeric film such that the nonwoven web is uniformly bonded to the elastomeric film to provide a homogeneous elastic material.

6. The method of claim 1, wherein the hydro jets do not rupture the elastomeric film.

7. The method of claim 1, wherein the hydro jets rupture the elastomeric film to provide apertures such that the film/nonwoven composite is breathable.

8. The method of claim 1, further comprising drying the film/nonwoven composite.

* * * * *